United States Patent
Berheide et al.

(10) Patent No.: US 9,304,226 B2
(45) Date of Patent: Apr. 5, 2016

(54) SCINTILLATOR-BASED NEUTRON DETECTOR FOR OILFIELD APPLICATIONS

(75) Inventors: Markus Berheide, Medford, MA (US); Bradley A. Roscoe, West Chesterfield, NH (US); Jing Qian, Arlington, MA (US); Timothy Spillane, Quincy, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/127,898

(22) PCT Filed: Jun. 26, 2012

(86) PCT No.: PCT/US2012/044200
§ 371 (c)(1),
(2), (4) Date: Dec. 19, 2013

(87) PCT Pub. No.: WO2013/003349
PCT Pub. Date: Jan. 3, 2013

(65) Prior Publication Data
US 2014/0124659 A1    May 8, 2014

Related U.S. Application Data

(60) Provisional application No. 61/501,248, filed on Jun. 26, 2011.

(51) Int. Cl.
*G01V 5/10* (2006.01)
*G01T 3/06* (2006.01)

(52) U.S. Cl.
CPC ... *G01V 5/10* (2013.01); *G01T 3/06* (2013.01); *G01V 5/107* (2013.01)

(58) Field of Classification Search
CPC ..................................................... G01V 5/10
USPC ........................................ 250/366, 367, 269.4
See application file for complete search history.

(56) References Cited

U.S. PATENT DOCUMENTS 3,566,118 A * 2/1971 Peters ........................... 250/367
4,267,446 A * 5/1981 Brown et al. .................. 250/255

(Continued)

FOREIGN PATENT DOCUMENTS

| WO | 2010144227 | 12/2010 |
| WO | 2012058440 | 5/2012 |

OTHER PUBLICATIONS

International Search Report of PCT Application No. PCT/US2012/044200 dated Mar. 21, 2013: pp. 1-5.

(Continued)

*Primary Examiner* — David Porta
*Assistant Examiner* — Faye Boosalis
(74) *Attorney, Agent, or Firm* — Daniel S. Matthews

(57) ABSTRACT

Borehole logging tools and systems that include a scintillator positioned to interact with scattered source neutrons that are received from a target formation. The scintillator emits luminescence in response to interaction with the scattered neutrons. The scintillator includes an aluminofluoride host material (e.g., LiCAF). In a specific embodiment, the aluminofluoride host material is doped with europium. In a further specific embodiment, a processor distinguishes scattered neutrons from gamma rays based upon identifying a peak within an output signal from the scintillator. In yet another specific embodiment, a system includes a first scintillator and a second scintillator. The processor subtracts luminescence generated by the second scintillator from luminescence generated by the first scintillator to identify a neutron response of the first scintillator.

20 Claims, 11 Drawing Sheets

(56) References Cited

U.S. PATENT DOCUMENTS

| | | |
|---|---|---|
| 8,044,367 B2 | 10/2011 | Yoshikawa et al. |
| 8,692,182 B2 * | 4/2014 | Nikitin et al. .................. 250/256 |
| 2010/0314550 A1 | 12/2010 | Yoshikawa et al. |
| 2011/0163237 A1 * | 7/2011 | Akers .................... G01T 1/203 250/362 |
| 2013/0320217 A1 * | 12/2013 | Kawaguchi et al. ...... 250/361 R |

OTHER PUBLICATIONS

Elshahawi et al., "Understanding Reservoir Architecture using Downhole Fluid Analysis and Asphaltene Science," SPWLA 52nd Annual Logging Symposium, May 2011: pp. 1-10.

Gektin et al., "LiCaAlF6:Ce crystal: a new scintillator," Nuclear Instruments and Methods in Physics Research A, 2002, vol. 486: pp. 24-277.

* cited by examiner

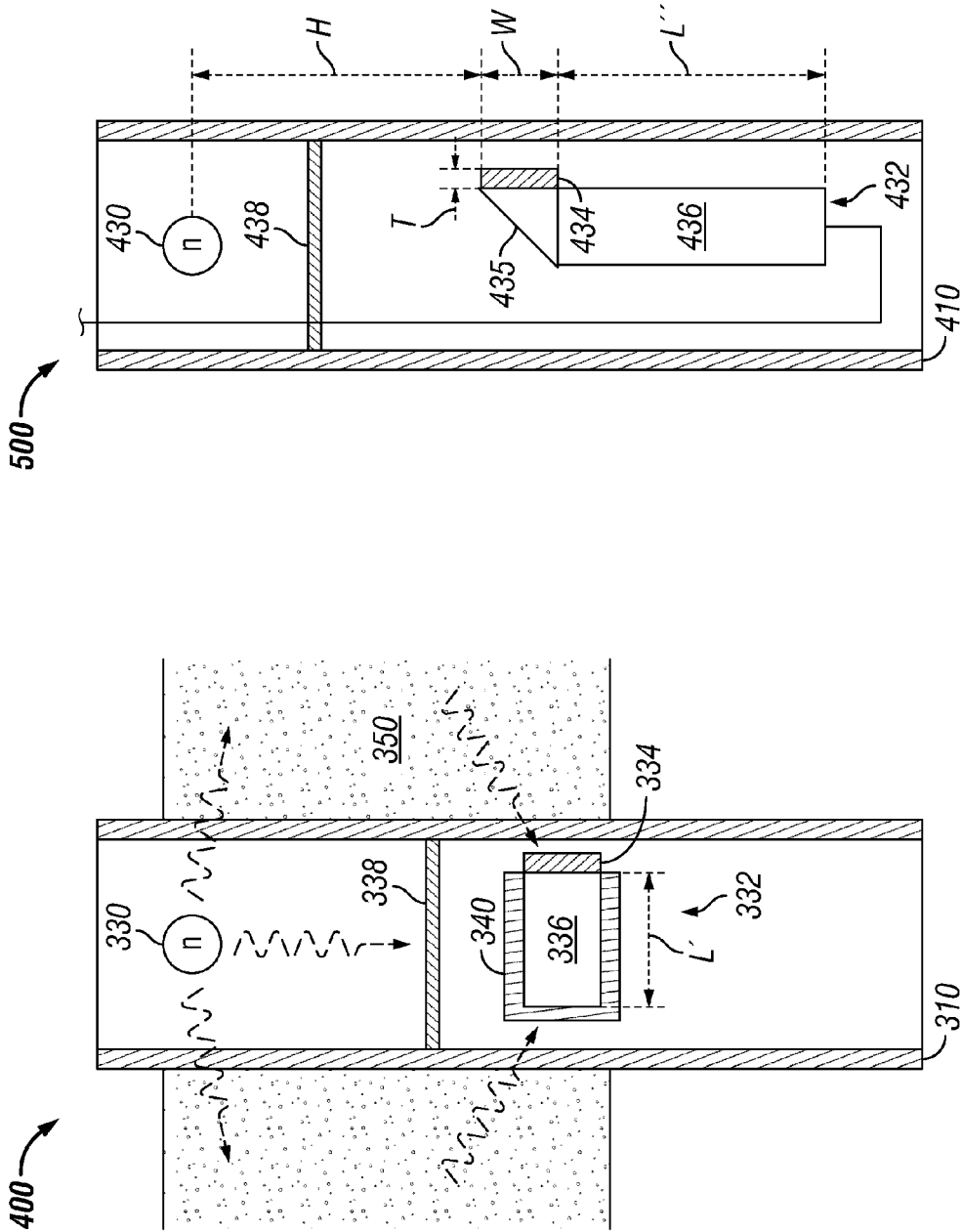

SCINTILLATOR-BASED NEUTRON DETECTOR FOR OILFIELD APPLICATIONS

CROSS-REFERENCE TO RELATED APPLICATIONS

This application is a U.S. National Stage Application under 35 U.S.C. §371 and claims priority to Patent Cooperation Treaty Application No. PCT/US2012/044200 filed Jun. 26, 2012, which claims the benefit of U.S. Provisional Patent Application Ser. No. 61/501,248 filed Jun. 26, 2011. Both of these applications are incorporated herein by reference in their entireties.

TECHNICAL FIELD

This disclosure relates to radiological evaluation of geologic formations in oilfield applications. More particularly, this disclosure relates to devices and methods used in detecting neutrons through scintillation.

BACKGROUND

Many common downhole applications rely on detection of thermal or epithermal neutrons. One of the applications is neutron porosity, which is part of what is known as "triple combo" and is a standard for any logging tool string. Downhole tools therefore often contain a neutron source and several thermal and epithermal neutron detectors.

The strengths of sources used to create neutrons are limited due cost and safety concerns (for example from material activation). In addition, chemical sources are limited in size by government regulations; whereas, the availability of electronic neutron sources, particularly in oilfield applications, are limited by reliability and thermal management. To compensate for limited neutron source strength, a common requirement for neutron detectors for oilfield applications (e.g., downhole) is high efficiency. As space within an oilfield measurement tool, or sonde, is restricted, a detector package is also limited in size (depending on application, approx. 13-76 mm diameter and 13-200 mm long), which makes the efficiency requirement more difficult to meet.

Another complication in oilfield applications is that neutron measurement tools are constantly moving. In such applications, signals have to be recorded promptly without any delays from internal processes or data acquisition. For certain types of measurements employing pulsed neutron sources, the detectors have to be particularly fast. An example of such a measurement is "Sigma" in which the neutron signal decay is measured on a time scale of tens of microseconds with a resolution as good as one microsecond. Therefore, an additional requirement for such detectors is a reasonably short time decay, which is in the microsecond range. Furthermore, the detectors should withstand the rugged borehole environment which means shock, vibration, elevated pressures and a range of temperatures from about −40° C. to about 200° C. The number of requirements, such as those mentioned above, has traditionally left only a small number of choices available for neutron detection.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a borehole logging tool. The tool includes a neutron source and a scintillator positioned to interact with scattered source neutrons that are received from a target formation. The scintillator emits luminescence in response to interaction with the scattered neutrons. The scintillator includes an aluminofluoride host material that is doped with europium. The tool also includes a luminescence detector configured to provide an output signal indicative of detected luminescence of the scintillator. In various embodiments, the aluminofluoride host is a LiCAF material.

In another specific embodiment, a borehole logging system includes a neutron source and a scintillator positioned to interact with scattered source neutrons that are received from a target formation. The scintillator emits luminescence in response to interaction with the scattered neutrons. The scintillator includes an aluminofluoride host material. The borehole logging tool also includes a luminescence detector that provides an output signal indicative of detected luminescence of the scintillator. A processor receives the output signal and distinguishes the scattered neutrons from gamma rays based upon identifying a peak within the output signal. In some embodiments, the peak within the output signal is identified using pulse shape discrimination (PSD). In additional or alternative embodiments, the peak within the output signal is identified using pulse height discrimination (PHD).

In another specific embodiment, a system for neutron detection includes a first scintillator that emits luminescence in response to interaction with neutrons and gamma rays. A second scintillator emits luminescence in response to interaction with gamma rays. The second scintillator is different from the first scintillator in at least one response parameter (e.g., wavelength of the luminescence or decay time of the luminescence). A luminescence detector provides an output signal indicative of detected luminescence of the first scintillator and the second scintillator. A processor receives the output signal and distinguishes between luminescence generated by the first scintillator and luminescence generated by the second scintillator using the at least one response parameter. The processor subtracts the luminescence generated by the second scintillator from the luminescence generated by the first scintillator to identify a neutron response of the first scintillator.

BRIEF DESCRIPTION OF THE DRAWINGS

Further features and advantages will become more readily apparent from the following detailed description when taken in conjunction with the accompanying drawings:

FIG. 5 shows, in partial cross section, a logging tool having a radiation-shielded scintillator-based neutron detector in accordance with another embodiment of the present disclosure;

FIG. 6 shows, in partial cross section, a logging tool having a light guide to redirect light from a scintillator slab to a photon detector in accordance with another embodiment of the present disclosure;

DETAILED DESCRIPTION

Figure 1:
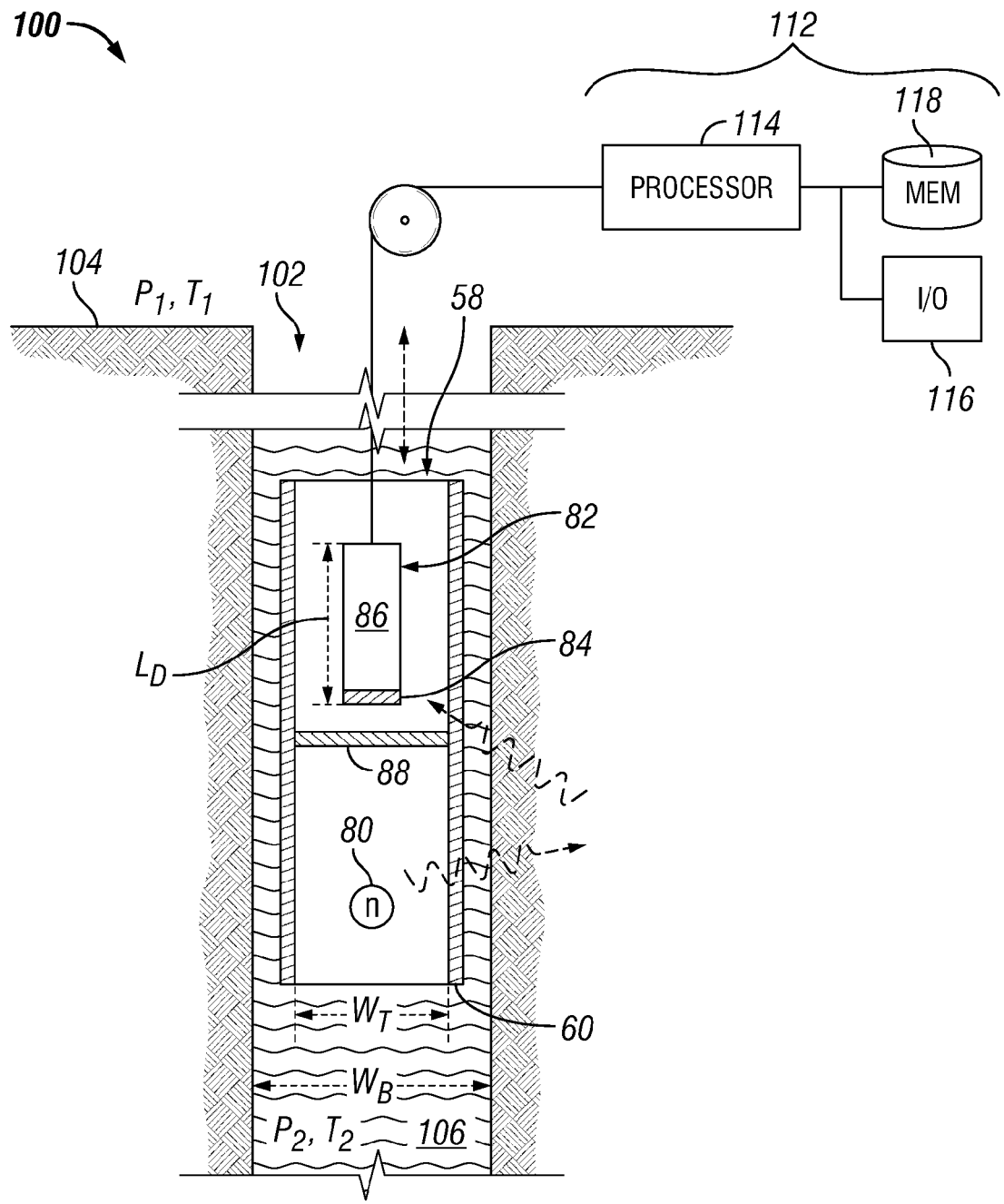
FIG. 1 shows, in partial cross section, a deployed well-bore logging system having a scintillator-based neutron detector in accordance with one embodiment of the present disclosure.

Illustrative embodiments of the present disclosure are directed to a neutron detector for use in downhole and other oilfield applications. In particular, the neutron detector includes a scintillator formed at least partially from an aluminofluoride host material. In a more specific embodiment of the present disclosure, the aluminofluoride host material is a "LiCAF" or LiCaAlF$_6$ material.

Conventional neutron detectors used in downhole and oilfield applications are scintillation detectors based on lithium halide compounds (e.g., LiI:Eu) and scintillating glasses (e.g., lithium-glass). A disadvantage of conventional scintillator-based detectors is their sensitivity to gamma rays. In other words, it can be difficult to determine whether light output from the scintillator material is based on neutron interaction with the material or based on gamma ray interaction with the material. This is so because the actual density and effective atomic number of scintillator materials increases even more than their particle density. This phenomenon creates background noise in the neutron signal and significantly decreases the statistical precision of measurements. This problem is compounded at high temperatures. The light output and resolution of most known scintillator-based neutron detectors degrade significantly as temperature increases.

LiCAF, as described herein, demonstrates improved response to thermal neutrons over alternative detectors currently used. The Applicants have conducted original research related to the application of LiCAF neutron detectors, which to the best of their knowledge has not been performed elsewhere. The Applicants' results have shown that the advantage of doped LiCAF, be it cerium-doped ("Ce") or europium-doped ("Eu"), or any other suitable activator, is that LiCAF does not suffer from temperature degradation as much as available alternatives, such as doped lithium iodine or lithium-glass.

Although cerium and europium are identified herein as possible dopants for LiCAF, it is by no way intended to be limiting to other activators that can be used, such as other rare earth elements. A particular advantage of LiCAF material over, for example, europium doped lithium iodide (LiI:Eu) is that the LiCAF material is non-hygroscopic, which simplifies the packaging requirements significantly. Also, a particular advantage over lithium-glass is that the composition of the LiCAF material (at least in its crystalline form) is well controlled in its stoichiometry and should show limited sample-to-sample variations. The LiCAF material also has well controlled parameters such as thermal expansion. Another advantage of certain LiCAF materials over lithium iodide and lithium-glass is that this LiCAF materials show significantly different detector responses to neutrons and gamma rays, which can be used in conjunction with specialized electronics to suppress the counts due to gamma rays (e.g., using pulse shape discrimination (PSD)).

In particular, europium-doped LiCAF is advantageous because europium-doped LiCAF has high light-output, as compared to lithium-glass. When mounted on an oilfield ready photomultiplier tube europium-doped LiCAF shows a much larger pulse height then lithium-glass. Europium-doped LiCAF maintains this advantage over the whole temperature range tested form −25° C. to 200° C. The high light output and resulting large pulse height allows for good signal to noise ratio. In addition europium-doped LiCAF makes high energy resolution possible and experiments show that resolution is favorable, as compared to lithium-glass.

As explained above, illustrative embodiments of the present disclosure are directed to a neutron detector for use in downhole and other oilfield applications. In particular, the neutron detector includes a scintillator formed at least partially from an aluminofluoride host material. FIG. 1 shows a cross section of a deployed well-bore logging system 100 having a scintillator-based neutron detector in accordance with one embodiment of the disclosure. A well borehole 102 is shown penetrating a surface of the earth 104. The well borehole 102 may be filled with a well fluid 106 as shown. A downhole portion 58 of the logging system 100 may include an elongated, fluid tight, hollow, body member or sonde 60, which during the logging operation, is passed longitudinally through the well borehole 102 and is sized for passage therethrough.

In the embodiment of FIG. 1, at least one radiation detector 82 is provided in the downhole sonde 60 and is separated from a neutron source 80 by a neutron shielding material 88. This illustrative example also includes surface instrumentation 112. For example, the surface instrumentation 112 includes a processor 114, an input/output device 116 and a data storage device 118. The detector 82 is configured to detect at least one of thermal neutrons (e.g., about 0.025 eV) and epithermal neutrons (e.g., between about 1 eV and about 10 k eV). The detector 82 includes a scintillator 84 that includes a material exhibiting luminance when struck by incoming particles (e.g., neutrons) of a certain energy level or range (e.g., thermal and/or epithermal neutrons). For example, in one embodiment, the scintillator includes an aluminofluoride host material. In a more specific embodiment of the present disclosure, the scintillator includes a LiCAF material doped with europium. LiCAF (e.g., $LiCaAlF_6$) doped with cerium or europium can be purchased from Tokuyama Corp, Japan.

In some embodiments, the LiCAF is used in a crystalline form. In other embodiments, for example, to keep manufacturing costs down, the LiCAF material is used in a polycrystalline form. In yet another embodiment, the LiCAF material is used in a ceramic form.

The scintillator 84 is positioned in optical communication with a luminescence detector 86 configured to provide a response (e.g., an electrical signal) indicative of the scintillator 84 being struck by a particle. In the illustrative embodiment of FIG. 1, a cylindrical scintillator crystal 84 is positioned adjacent to an elongated photo multiplier tube (PMT) 86. The PMT 86 is axially oriented, such that its length LD is not restricted by a width of an opening WT of the sonde 60.

Figure 2:
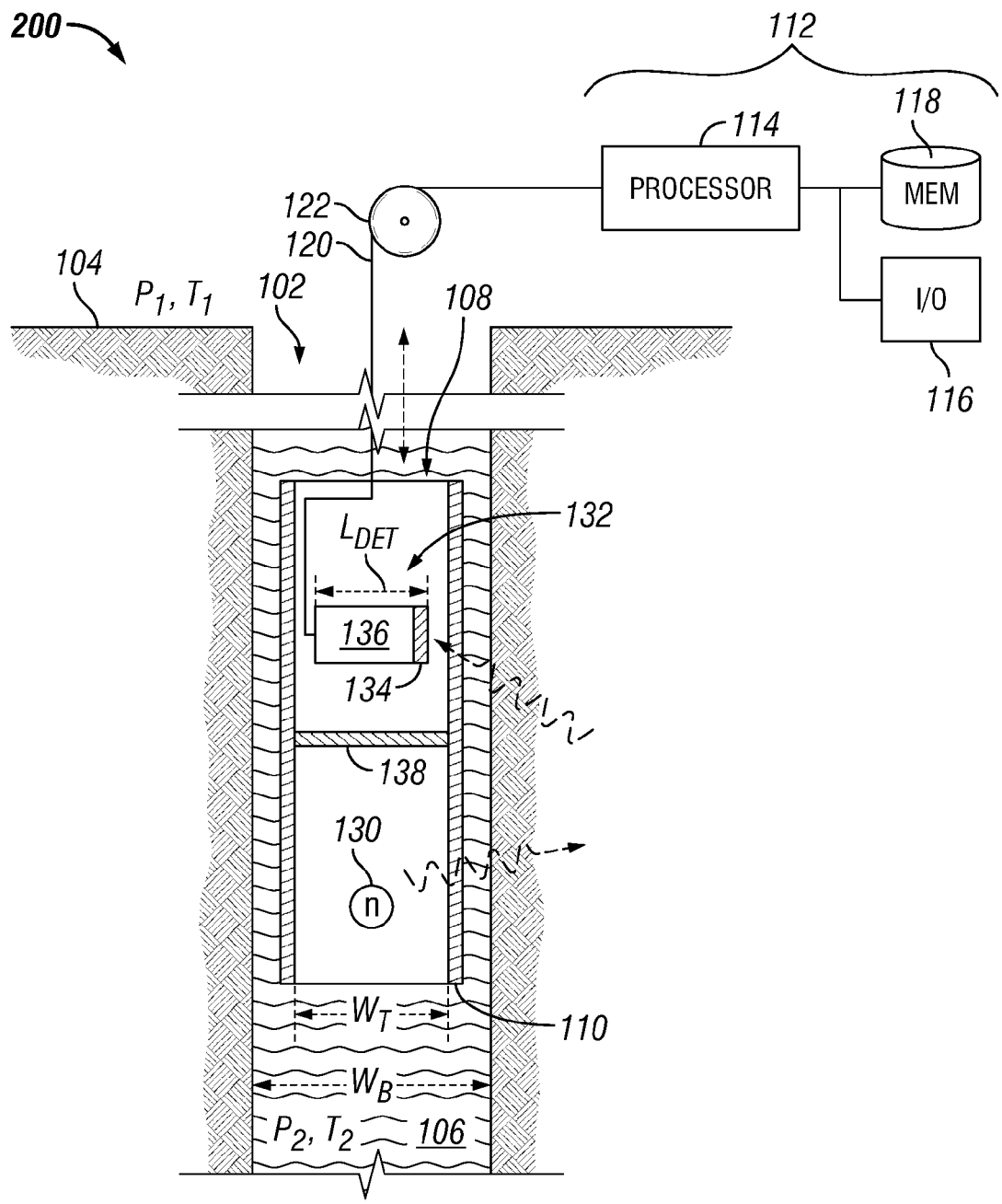
FIG. 2 shows, in partial cross section, a deployed well-bore logging system having a scintillator-based neutron detector in accordance with one embodiment of the present disclosure.

FIG. 2 shows a cross section of a deployed well-bore logging system 200 having a scintillator-based neutron detector in accordance with another embodiment of the disclosure. A well borehole 102 is shown penetrating a surface of the earth 104. The well borehole 102 may be filled with a well fluid 106. A downhole portion 108 of the logging system 200 may include an elongated, fluid tight, and hollow body member (e.g., sonde) 110, which during the logging operation, is passed longitudinally through the well borehole 102 and is sized for passage through the well borehole. The examples described herein refer to oilfield applications generally known as wire line. Use of any of the scintillator-based neutron detector arrangements and/or methods described herein are contemplated for use in any of various oilfield applications, such as techniques generally known as "wire line," "logging-while-drilling," and surface analysis of wellbore samples, including laboratory analysis.

As shown in FIG. 2, the well bore 102 is substantially circular in transverse cross section, having a diameter WB. In the illustrative example, the sonde 110 is substantially cylindrical, having a diameter less than that of the well borehole 102 to allow for ease of passage through the well borehole. It is contemplated that in other embodiments, the sonde may take on other non-cylindrical shapes. In at least some embodiments, the relative diameters are such that some of the well fluid 106 may reside between an outer surface of the sonde 110 and an adjacent inner wall of the well borehole 102. An inner hollow of the sonde 110 in the illustrative example is substantially cylindrical, having an inner diameter WT. The shape and size of the hollow portion of the sonde 110 provides physical size constraints upon instrumentation placed therein.

When positioned at a depth within the well borehole 102, the sonde 110 will experience a locally ambient temperature T2 and pressure P2 that will likely differ substantially from ambient conditions at the surface T1, P1. For example, well borehole 102 temperatures may be 100-200° C. depending upon the depth and other geological conditions. Similarly, ambient pressures may be well in excess of surface values. Such elevated temperatures and pressures place additional constraints upon the downhole portion 108 of the logging system 200.

The illustrative example also includes surface instrumentation 112. For example, the surface instrumentation includes a processor 114, an input/output device 116, and a data storage device 118. Such surface instrumentation 112 can be used in processing and/or recording electrical measurements provided by the sonde 110. A well logging cable 120 is coupled between the downhole portion 108 and the surface instrumentation 112. The well logging cable 120 passes over a sheave wheel 122 supporting the sonde 110 in the borehole 102 and in the illustrative example, also provides a communication path for electrical signals to and from the surface equipment 112 and the sonde 110. The well logging cable 120 may be of conventional armored cable design and may have one or more electrical conductors for transmitting such signals between the sonde 110 and the surface instrumentation 112.

In the example of FIG. 2, the sonde 110 contains, at its lower end, a pulsed neutron source 130. The neutron source 130 may comprise a deuterium-tritium accelerator tube which can be operated in pulsed mode to provide repetitive pulses or bursts of essentially mono-energetic (e.g., 14 MEV neutrons and capable of providing on the order of 10+8 neutrons per second). A pulsing circuit (not shown) provides electrical pulses, which are timed in a manner to be described subsequently to cause the neutron generator 130 to repetitively emit neutron pulses of a certain width (e.g., approximately 10 microseconds duration).

At least one scintillator-based radiation detector 132 is provided in the downhole sonde 110 and is separated from the neutron source 130 by a neutron shielding material 138. The shielding material 138 is configured to scatter neutrons away from the tool. The neutron shield material 138 may include a dense material with a high atomic number, such as tungsten. In additional or alternative embodiments, the neutron shield 138 may include a material with high neutron cross section, such as Borated rubber. In yet other illustrative embodiments, the neutron shielding material 138 may comprise any highly hydrogenous material, such as paraffin or hydrocarbon polymer plastics, to effectively slow down and shield the detector 132 from direct neutron irradiation by the neutron source 130.

While only a single detector 132 is shown in FIG. 2, illustrative embodiments of the present disclosure include multiple detectors within the sonde 110. In one example, two detectors 132 are located on the same side of the sonde 110 relative to the neutron source 130. In another illustrative embodiment, a first detector 132 is located above the neutron source 130 and a second detector 132 is located below the neutron source. In some embodiments, the detectors 132 are equidistant from the source 130. In further illustrative embodiments, the neutron source 130 is positioned towards an upper end of the sonde 110, while any detectors 132 are positioned towards a lower end of the sonde. The relative positioning of the neutron sources 130 and detectors 132 shown in any of the embodiments described herein is merely intended by way of example.

The detector 132 as shown in FIG. 2 is configured to detect at least one of thermal neutrons (e.g., about 0.025 eV) and epithermal neutrons (e.g., between about 1 eV and about 10 k eV). This detector 132 includes a scintillator 134 fashioned from a material exhibiting luminance when struck by incoming particles (e.g., neutrons) of a certain energy level or range (e.g., thermal and/or epithermal neutrons). The scintillator 134 is positioned in optical communication with a luminescence detector 136 configured to provide a response (e.g., an electrical signal) indicative of the scintillator 134 being struck by a particle.

Such a detector 132 could comprise, for example, a scintillator 134 that includes an aluminofluoride host material (e.g., LiCAF), which is sensitive to neutron interaction (primarily thermal), in combination with a photon detector 136, such as a photo multiplier tube (PMT). Such scintillator detectors 132 may also be sensitive to high energy gamma radiation produced by the capture of neutrons from the neutron source 130 in earth formations surrounding the well borehole 102. However, in illustrative embodiments of the present disclosure, the pulse shape characteristics of the gamma ray interactions with the scintillator material may be distinguished from the pulse shape characteristics of neutron interactions with the scintillator material.

In more detail, the detector 132 provides electrical pulse signals representative of the number of electrons created by a single neutron event in the target energy range to which the detector is sensitive (e.g., thermal and/or epithermal neutrons) and their time distribution. The electrical signals from the detector 132 can be amplified or otherwise conditioned in an electronic conditioning circuit (e.g., an amplifier—not shown) and otherwise manipulated by other circuitry (e.g., a multiplexing mixing circuit for multiple detectors—not shown). The conditioned electrical signal can be supplied via the cable 120 conductors to additional surface circuitry (e.g., de-multiplexing or un-mixing circuits—not shown). Output signals comprise pulse signals representative of the target neutron population in the vicinity of the detector 132. The resulting pulse signals can be subjected to further processing, for example, in the processor 114. Such processing can be accomplished by digital signal processing (DSP) techniques, software, or some combination of DSP and software. In one particular embodiment, the processor 114 distinguishes between the pulse shape characteristics of neutrons and the pulse shape characteristics of gamma rays using pulse shape discrimination, as further described below.

Figure 3:
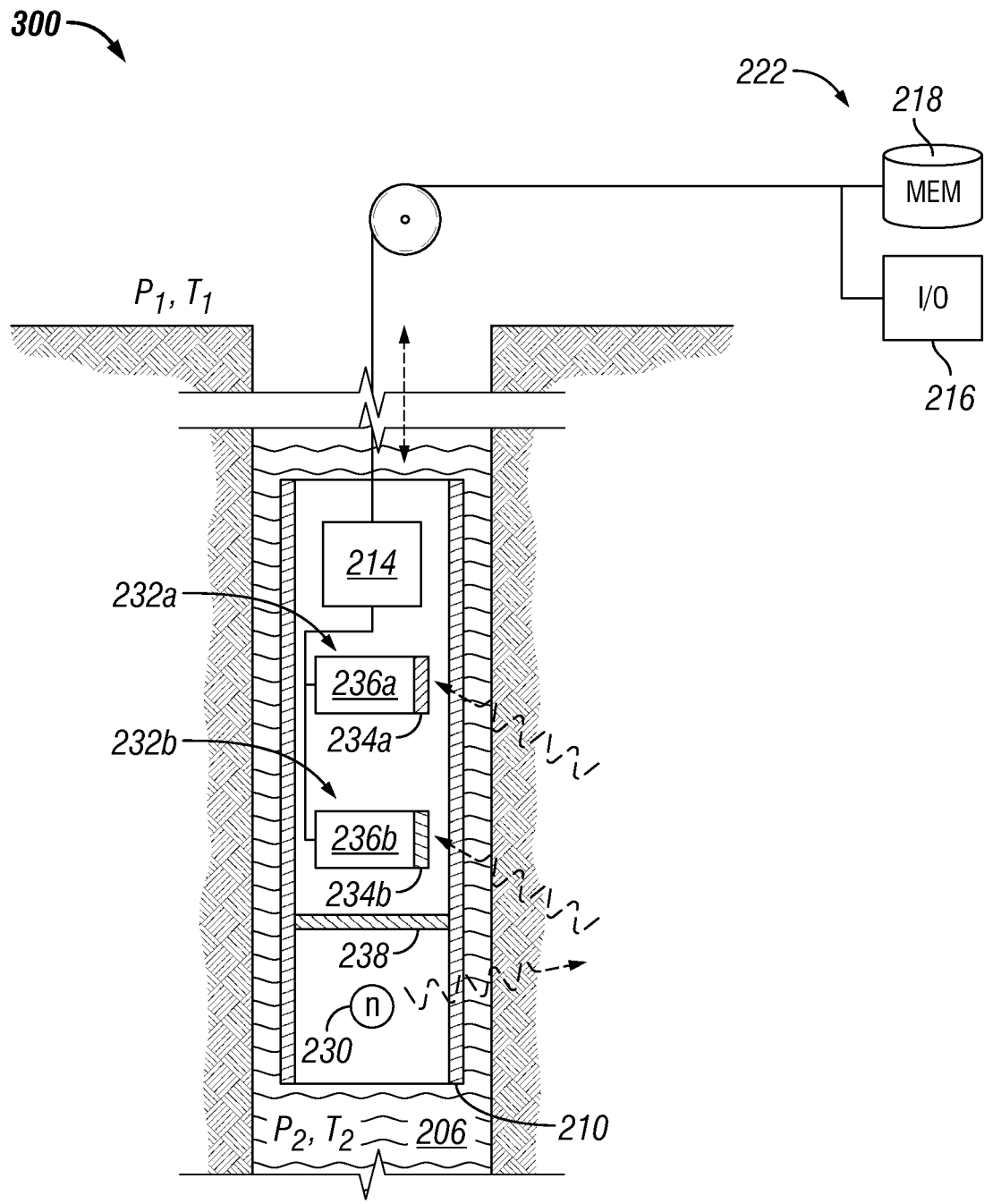
FIG. 3 shows, in partial cross section, a deployed well-bore logging system having a scintillator-based neutron detector array in accordance with another embodiment of the present disclosure.

FIG. 3 shows a cross section of a deployed well-bore logging tool 300 having a scintillator-based neutron detector array in accordance with yet another embodiment of the disclosure. In this alternative embodiment, an array of two different detectors 232a, 232b (generally 232) are positioned within an inner hollow of a sonde 210. Each of the detectors 232a, 232b can be identical (e.g., both using europium doped LiCAF) and for example, measure similar neutron interactions at different locations. Alternatively or in additional embodiments, each of the detectors 232a, 232b can be different. The detectors 232 are positioned in a spaced apart relation to a neutron source 210 and separated therefrom by an energetic neutron barrier or shield 238. It is contemplated that the array may include more than two detectors 232 and that such detectors may be positioned or otherwise oriented in any of various arrangements (e.g., linearly spaced along a longitudinal tool axis, radially about a common axis, any of a variety of detector alignments, and combinations of the like).

In this illustrative example, surface equipment 222 includes an I/O device 218 and a storage device 216. A processor 214, in electrical communication between the detectors 232 and the surface equipment 222, is shown as being internal to the sonde 210. It is envisioned that various configurations with one or more of the processors 214, I/O devices 218, and storage devices 216 can be provided downhole, at the surface, or split between downhole and the surface as may be advantageous for implementation of deployed well-bore logging systems.

Continuing with the illustrative example, each of the detectors 232a, 232b can be identical (e.g., both using europium doped LiCAF) and measure similar neutron interactions at different locations. Alternatively or in addition, each of the detectors 232a, 232b can be different. For example, one detector can include a scintillator material 234a (e.g., europium doped LiCAF), while the other detector can include a different scintillator material 234b (e.g., cerium doped LiCAF). In some embodiments, the second scintillator is different from the first scintillator in at least one response parameter, such as a wavelength of the luminescence generated by the scintillator and/or a decay time of the luminescence generated by the scintillator. A luminescence detector provides an output signal indicative of detected luminescence of the first scintillator and the second scintillator. A processor receives the output signal and distinguishes between luminescence generated by the first scintillator and luminescence generated by the second scintillator using the at least one response parameter.

In some embodiments, it may be advantageous to configure at least one of the detectors 232 as an energetic neutron detector. Although two detectors are shown, it is envisioned that a greater number of detectors can be provided, for example, being distributed at axially different locations, radial orientations, or combinations of axial and radial variations.

In some embodiments, LiCAF scintillator-based neutron detectors include at least two different dopants. In some embodiments, such multi-dopant scintillators can be used advantageously because temperature responses for the two differently doped materials are similar. By way of example, at least two slabs of detector material can be configured in a back-to-back (or side-by-side) arrangement, where one slab is sensitive to neutron radiation and the other slab is primarily sensitive to gamma radiation. In one embodiment, the different sensitivity to neutrons is achieved by enriching one slab in $^6$Li. In some embodiments, the other slab is used with natural lithium content or the other slab is enriched with $^7$Li. In another embodiment, the slabs may have similar $^6$Li content, but one slab may effectively be shielded by the other from thermal neutrons. In some embodiments, luminescence from both detector slabs are read out by a single photon detector (e.g., photo multiplier tube ("PMT")), which is a cost advantage over a twin detector as described above. In one such embodiment the signals from the two slabs can be distinguished by, for example, making one slab out of cerium-doped LiCAF and the other from europium-doped LiCAF. A computer processor can be used to distinguish between the different decay times of the signals coming from the slabs.

Figure 4A:
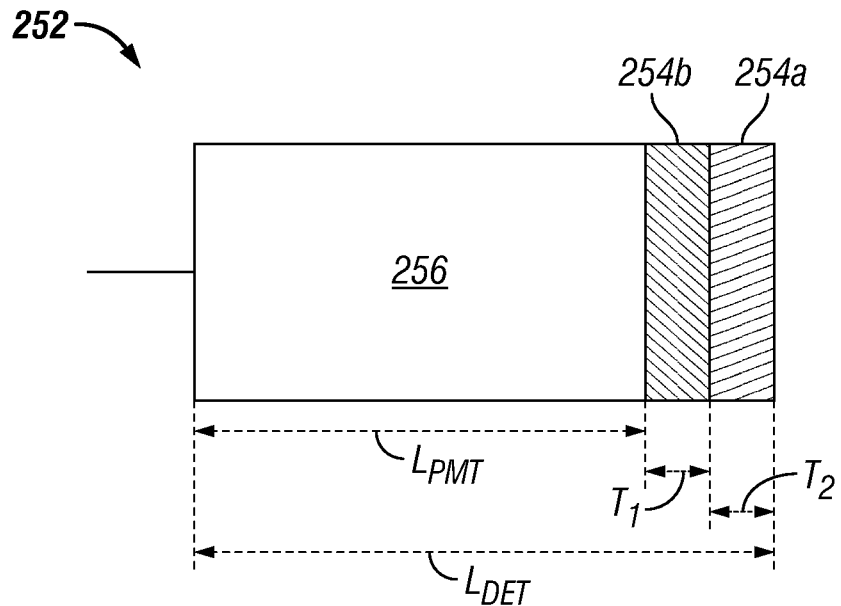
FIG. 4A shows a schematic diagram of a composite scintillator-based neutron detector in accordance with one embodiment of the present disclosure.
Figure 4B:
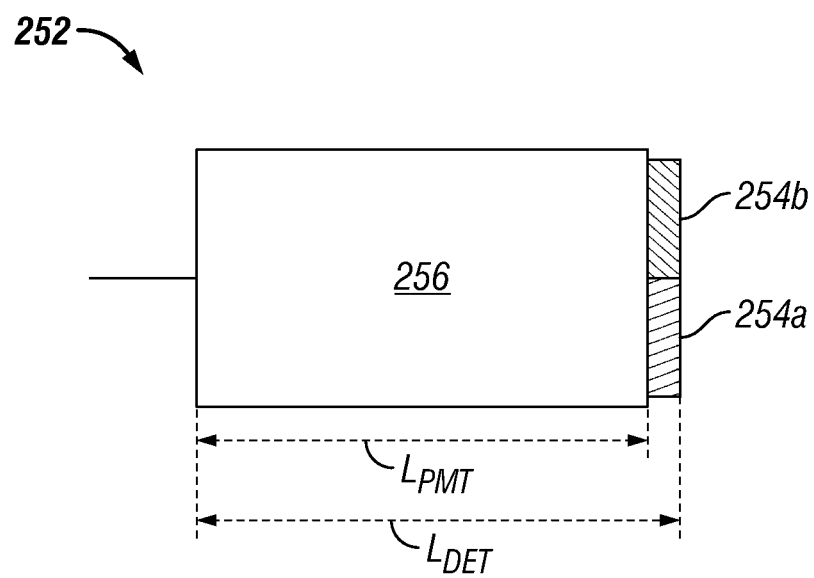
FIG. 4B shows a schematic diagram of a composite scintillator-based neutron detector in accordance with another embodiment of the present disclosure.

Referring to FIG. 4A, a schematic diagram is shown for an embodiment of such a composite scintillator-based neutron detector. In the illustrative example, a first scintillator slab 254a, having a respective thickness $T_2$ is positioned adjacent to a second, different scintillator slab 245b, having a respective thickness $T_1$. In the illustrative embodiment, the scintillator slabs are substantially planar (shown in cross section) positioned adjoining along planar surfaces. In the illustrative example, the two materials are shown in intimate contact, although it is envisioned that an interstitial material, such as a bonding agent, protectant, or the like can be included. A light (i.e., photon) detector, such as a PMT 256 is positioned with respect to the two different scintillator slabs 245a, 254b (generally 254) in order to provide a response to neutrons impinging on one or more of the scintillator slabs 254. In the illustrative embodiment, a PMT 256 is positioned facing one planar surface of the second scintillator slab 245b and an opposite planar surface of the second scintillator slab 254b faces an adjacent planar surface of the first scintillator slab 254a. In another embodiment, as shown in FIG. 4B, the scintillator slabs 245 are mounted side-by-side on the photodetector 256. In this manner, light absorption effects that may be observed in some scintillator materials would not affect the transfer of light to the PMT. Also, if the slabs 254a and 254b are made of the same host material and their thicknesses are equal, then the gamma ray response will be substantially congruent. A substantially congruent response facilitates subtraction of the gamma ray response.

In some embodiments, the one or more LiCAF detector slabs 245 may have a thickness that is sufficient to stop a majority of the neutrons within the first slab 245a. In one specific embodiment, for 95% $^6$Li enriched LiCAF, the thickness can range between 3 to 6 mm. In another specific embodiment, two LiCAF detector slabs are oriented such that the first slab 245a faces the formation and the other slab 245b is positioned behind the first slab so that radiation from the formation reaches second slab by traversing through the first slab. As neutrons enter the first slab 245a, the neutron will react with the lithium within the LiCAF material, which will result in the release of energetic charged particles. The depth of penetration of neutrons into the slab and the interaction region of charged particles is small and is substantially contained within the first slab 245a. On the other hand, gamma rays will, with relative high probability, release some energy in both slabs. In various embodiments, the thickness of the first slab 245a is sufficiently thick so that a majority (and in at least some embodiments, essentially all) neutrons are stopped in the first slab 245a. In this manner, the first slab 245a detects primarily neutron signals, whereas the second slab 245b detects primarily gamma rays because the second slab is effectively shielded from neutrons by the first slab. In additional or alternative embodiments, slab 254b may have a natural lithium composition or the slab may be depleted in $^6$Li and, thus, be much less sensitive to neutron interactions. In some embodiments, slab 254b may additionally be covered by a thin layer of neutron absorbing material, which also reduces the neutron sensitivity for the slab without significantly changing the gamma sensitivity.

Radiation events in the first slab 245a cause excitation of the scintillator crystal with subsequent transfer to the dopant and light emission with an intensity and time decay typical for the material of the first slab (e.g., LiCAF:Ce). Radiation events in the second slab will also cause light emission in a similar fashion, but with an intensity and decay time typical for second slab (e.g., LiCAF:Eu). If the decay time of the emissions is sufficiently different a computer processor can apply pulse shape discrimination (PSD) to distinguish the two spectra of first slab 245a and the second slab 245b. In this manner, some embodiments advantageously have two pulse height spectra generated with only one photon detector (e.g., PMT). A pulse height spectrum is a histogram of the number of pulses counted (in short counts) versus pulse height of the pulses. To create a discrete spectrum that can easily be stored, the pulse heights are sorted by a multichannel analyzer (MCA) into intervals called pulse height channels or simply channels. In logging applications, the discrete spectrum (counts versus channel) resulting from the measurement at a certain depth is typically saved in the form of an array tagged with depth (or a depth index). One spectrum shows significant sensitivity to neutrons and the second shows a gamma spectrum without (or with limited) sensitivity to neutrons. In various embodiments, a device measuring the gamma spectrum is closely enough collocated with the neutron sensitive device that an effective gamma subtraction can be performed. The term "collocated" is frequently used in the art. Two devices are collocated means the devices sense a similar depth section of the formation and a similar volume of the formation. The subtraction of the spectra is performed in real time and/or in post-processing. The subtraction of the spectra is performed by taking the spectrum associated with scintillator slab 245a at a given depth and subtracting the spectrum associated with detector slab 245b at the same depth. In certain embodiments, an additional depth averaging over the spectrum arrays, as known in the art, may be applied to reduce statistical scatter on the data. An additional characterization of the response of the slabs may be performed in known borehole environments and a correction factor may be applied to one or both of the spectra before subtraction. The correction factor may have an environmental dependence and thus may be a function of environmental parameters. The factor may be a function of parameters such as neutron output from the source and/or formation parameters such as hydrogen index, density and lithology. Other parameters may also apply. In a specific implementation, the design of the slabs and the materials used are such that the corrections are smaller than a 5% percent of the total spectrum for each slab.

Additional shielding may be applied to shield the composite detector from gamma rays. In various embodiments, the shielding could be a dense material such as lead and the geometry may be such that the shielding is between the detector slabs, the pressure housing and/or also surrounding sides of the slabs. In another design, the entire composite detector could be encapsulated in a gamma shield.

FIG. 5 shows a cross section of a logging tool having a radiation-shielded scintillator-based neutron detector in accordance with one embodiment of the present disclosure. The downhole logging tool 400 includes a sonde 310 including a neutron source 330 and a neutron detector 332 separated by an energetic neutron shield 338. The detector 332, in turn, includes at least one scintillator material 334 (e.g., LiCAF) positioned to face a formation (e.g., laterally with respect to a longitudinal axis of the tool). In the illustrative example of FIG. 5, a substantially planar detector 334 (slab) is positioned with one face directed toward the lateral formation 350 (e.g., directed radially outward from a central axis). A photon detector, such as a PMT 336, is positioned adjacent to an opposite surface of the planar scintillator 334 and otherwise configured to detect photons induced within the scintillator 334 by interaction with a neutron directed from the formation. As shown, the generally elongated PMT 336 is positioned with its longitudinal axis transverse to a longitudinal axis of the sonde 310. For example, the PMT 336 is aligned along a diameter of the sonde 310. According to limited space generally available within oilfield sondes, compact PMTs are selected having dimensions commensurate with the available space. To the extent other compact photon detectors, such as semiconductor devices, can withstand the environmental conditions; other such devices can be used in combination with any of the scintillators described herein. Such semiconductor devices include photodiodes and avalanche photodiodes.

As described above, the energetic neutron shield 338 protects or otherwise shields the detector from neutrons directed from the neutron source 330. Likewise, positioning a face of the planar scintillator 334 toward the formation 350 provides preferential detection of neutrons from the formation 350 rather than from the borehole. In some embodiments, additional neutron shielding 340 can be provided to further shield the scintillator 334 and/or the PMT 336 from non-preferential neutrons. In the illustrative example of FIG. 5, such a neutron shield 340 (shown in cross section) is provided along rear and side portions of the detector 332. Such shield material can be any suitable material, in a suitable configuration (e.g., thickness) to shield or otherwise block (i.e., scatter and/or absorb) non-preferential neutrons. A commonly used neutron shielding material is $B_4C$ in a epoxy matrix material. In such a configuration, the detector 332 is configured to maximize neutron detection from a certain sample volume (e.g., the formation 350). In some embodiments, such additional radiation shield may be provided along an outer body of the detector 332, along an inner wall of the sonde 310 or some combination of the like.

In each of the above examples, the PMT detector 136, 236, 336 is configured in a transverse plane with respect to the sonde 110, 210, 310 and in this sense subject to dimensional limitations of the available volume. Relative short or otherwise compact PMTs can be selected to fit within diameters of the sonde 110, 210, 310. In some applications, it may be advantageous to relieve at least some of the dimensional requirements by configuring the PMT along a longitudinal axis of the sonde.

FIG. 6 shows a cross section of a logging tool 500 configured with a PMT along a longitudinal axis of the sonde. In FIG. 6, a neutron detector 432 includes an elongated photon detector (e.g., PMT 436) parallel to or otherwise coincident with a longitudinal axis of the sonde 410. The detector 432 includes a planar (slab) scintillator 434 facing laterally as in the previous examples. Such lateral orientation provides similar benefits as described above. Also shown is an optical redirecting path element 435 re-directing at least a non-trivial portion of luminescence from the lateral, planar scintillator 434 toward an input of the axial PMT 436. For example, the optical redirecting path element 435 can include one or more of an optical waveguide, a prism, an optical fiber, and the like.

It is envisioned that downhole logging tools can combine any of the various elements and features described herein and equivalents thereof. For example, multiple detectors can include one or more of axially-redirected detectors (e.g., 432), lateral detectors (e.g., 132, 232, 323), axial detectors in which a planer scintillator is substantially in a transverse plane of the sonde 110, 210, 310, 410 (not shown), and combinations of one or more of any such detectors. Likewise, one or more of the detectors may include additional shielding as shown in reference to FIG. 6. Additional shielding against gamma rays may be applied from the formation side or enclosing the entire detector.

Illustrative embodiments of the present disclosure are also directed to a computer processor or specialized electronics that process an output signal that is received from a neutron detector. In accordance with various embodiments of the present disclosure, the neutron detector includes a scintillator material composed of an aluminofluoride host material (e.g., LiCAF doped with europium). The output signals received from the neutron detector are representative of neutron and gamma rays that interact with the scintillator material. In various embodiments, the computer processor is the processor 114 shown in FIGS. 1 and 2. The computer processor is programmed to distinguish the scattered neutrons from gamma rays by identifying a peak within the output signal. In various embodiments, the peak within the output signal is identified using pulse shape discrimination, which is further described below. In additional or alternative embodiments, the peak within the output signal is identified using pulse height discrimination, which is also further described below.

Figure 7A:
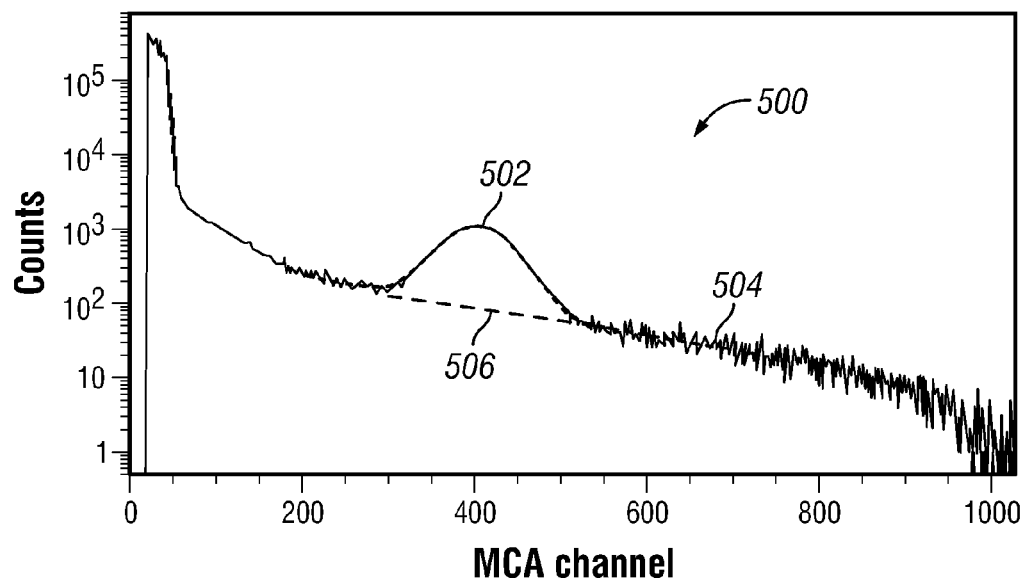
FIG. 7A shows a logarithmic plot of the pulse height spectrum (counts/channel v. channel) obtained from a cerium-doped LiCAF based detector and shows a fit to the spectrum in the region of interest (red line) and an exponential approximation of the non-neutron related background (dashed line that are caused in this embodiment predominantly by high-energy gamma rays) in accordance with one embodiment of the present disclosure.

FIG. 7A shows a representative plot of a pulse height spectrum 500 obtained from one embodiment of a LiCAF scintillator doped with cerium. The spectra were measured with an AmBe source in a water tank at room temperature. A neutron peak 502 appears at channel 400 and is indicative of preferential neutron detection. The neutron peak 502 extends from a generally downward sloping baseline portion of the spectrum 504, which results predominantly from background gamma radiation. The plot also shows approximation of the gamma radiation spectrum 506 in the region of the neutron peak 502. Such an approximation can be derived from the data points representing the respective counts at each edge of the neutron peak 502 and an exponential curve fitted through these data points.

Figure 7B:
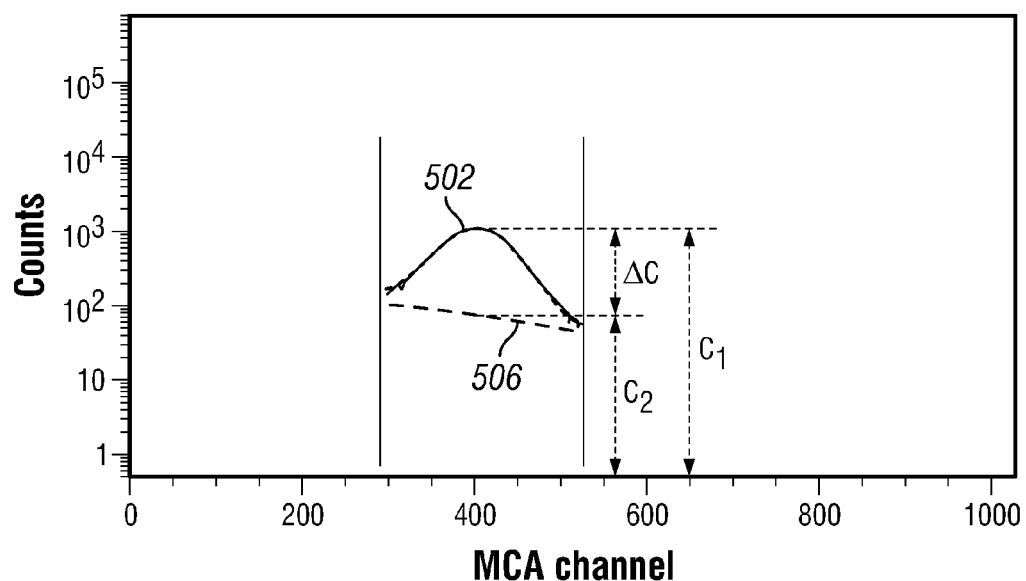
FIG. 7B shows a logarithmic plot of the pulse height spectrum (counts/channel v. channel) shown in FIG. 7A within a region of a discriminator window and shows a fit to the spectrum shape and the background approximation in accordance with one embodiment of the present disclosure.
Figure 7C:
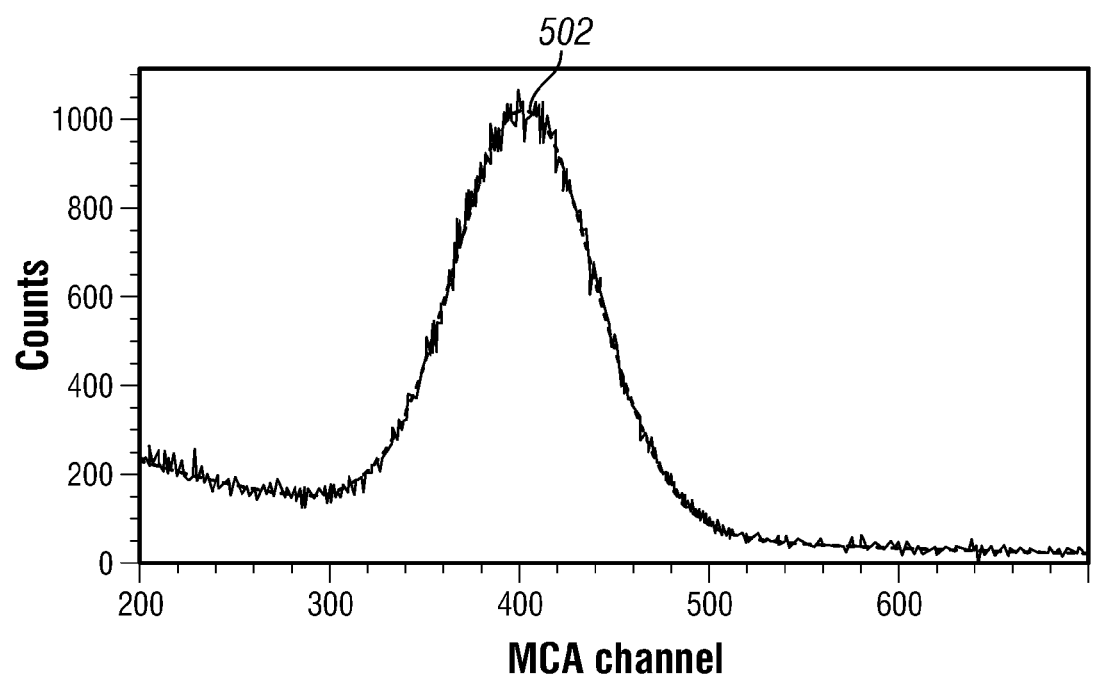
FIG. 7C shows a linear plot of the pulse height spectrum shown in FIG. 7B in accordance with one embodiment of the present disclosure.

Illustrative embodiments of the present disclosure are directed to using the difference in pulse heights to distinguish between neutron interactions and gamma ray interactions. In particular, pulse height discrimination (PHD) is used to distinguish between neutron interactions and gamma ray interactions within the LiCAF material. To this end, a discriminator region is defined within a plot of the pulse height spectrum. FIG. 7B shows a discriminator region for the representative plot of the pulse height spectrum shown in FIG. 7A. A discriminator region is defined as the region of the spectrum including the relative peak 502. The discriminator region can be obtained by limiting results to those interactions within the relative peak. For example, in FIG. 7A, the results are limited to channels between 300 and 525. FIG. 7C shows a linear plot of the pulse height spectrum shown in FIG. 7B.

A total peak count (e.g., C1) is used as an indication of neutron interactions. The neutron interactions can be separated from the gamma radiation interactions by subtracting a portion of the count due to the estimated gamma radiation spectrum (e.g., C2) from the total peak count (e.g., C1). The portion of the count due to the estimated gamma radiation spectrum (e.g., C2) is estimated using the exponential fit of the gamma radiation spectrum 506 in the region of the relative peak 502. The portion of the count due to neutron interactions is illustrated as ΔC for the peak count value at about channel 525. The computer processor or other specialized electronics can be programmed to distinguish between neutron interactions and gamma ray interactions based upon the above described pulse height discrimination. In some embodiments, the programmed processor applies a lower threshold below the onset of the neutron peak and, thus, distinguishes neutron interactions from lower energy gamma background interactions.

Figure 8A:
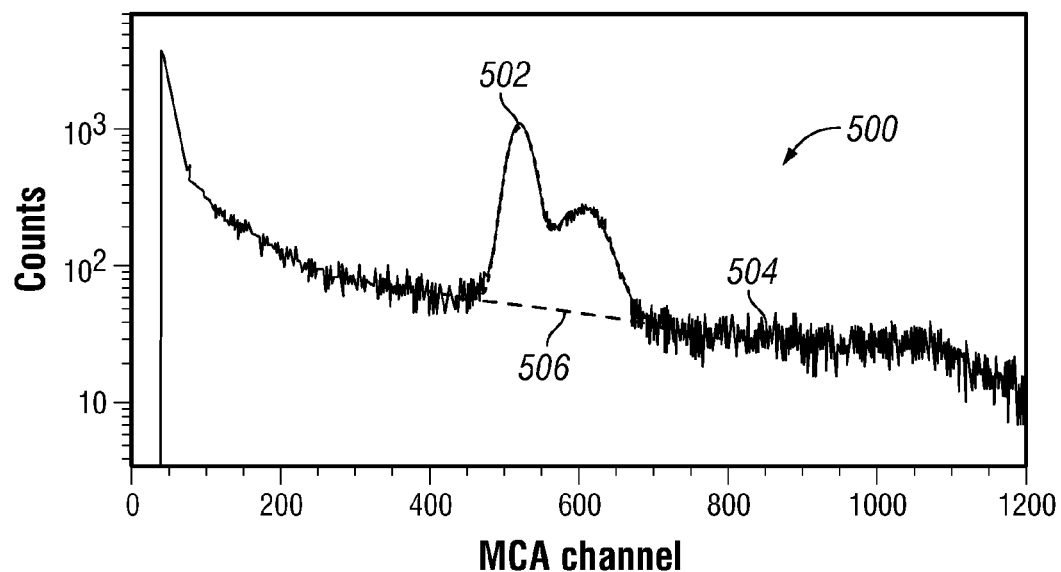
FIG. 8A shows a logarithmic plot of the pulse height spectrum (counts/channel v. channel) obtained from a europium-doped LiCAF based detector and a fit to a spectrum shape in the region of the discriminator window in accordance with one embodiment of the present disclosure.
Figure 8B:
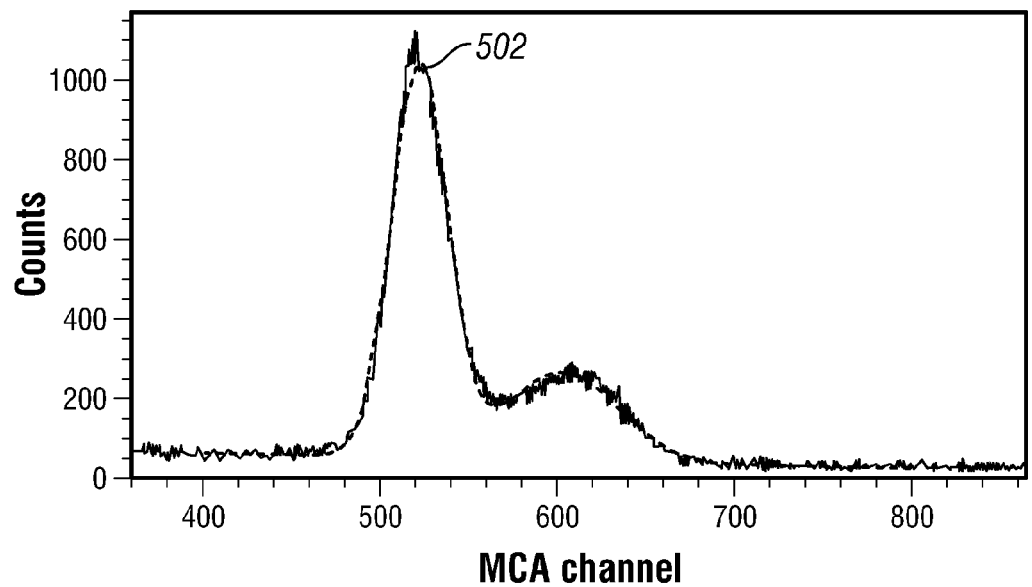
FIG. 8B shows a linear plot of the pulse height spectrum shown in FIG. 8B in accordance with one embodiment of the present disclosure.

FIG. 8A shows similar results that were obtained from another LiCAF scintillator doped with europium, also using an AmBe source in a water tank. A neutron peak 502 appears at channel 520 and is indicative of favorable neutron detection. Note that the neutron peak is not necessarily of Gaussian shape. Here it can be approximated by 2 Gaussian functions of different width and centroid. The neutron peak 502 extends from a generally downward sloping baseline portion of the spectrum 504, which results predominantly from background gamma radiation. The plot also shows an approximation of the gamma radiation spectrum 506 in the region of the neutron peak 502 in form of an exponential curve. FIG. 8B shows a linear plot of the pulse height spectrum shown in FIG. 8B.

Pulse shape discrimination (PSD) has been used in laboratory conditions in conjunction with scintillator materials that have differences in the time decay between neutron related and gamma related interactions (e.g., lithium-iodide and lithium-glass). The inventors have recognized that this approach has not been applied in any oilfield applications because of the unsuitability of known materials, such as lithium-iodide and lithium-glass, in oilfield applications.

Figure 9A:
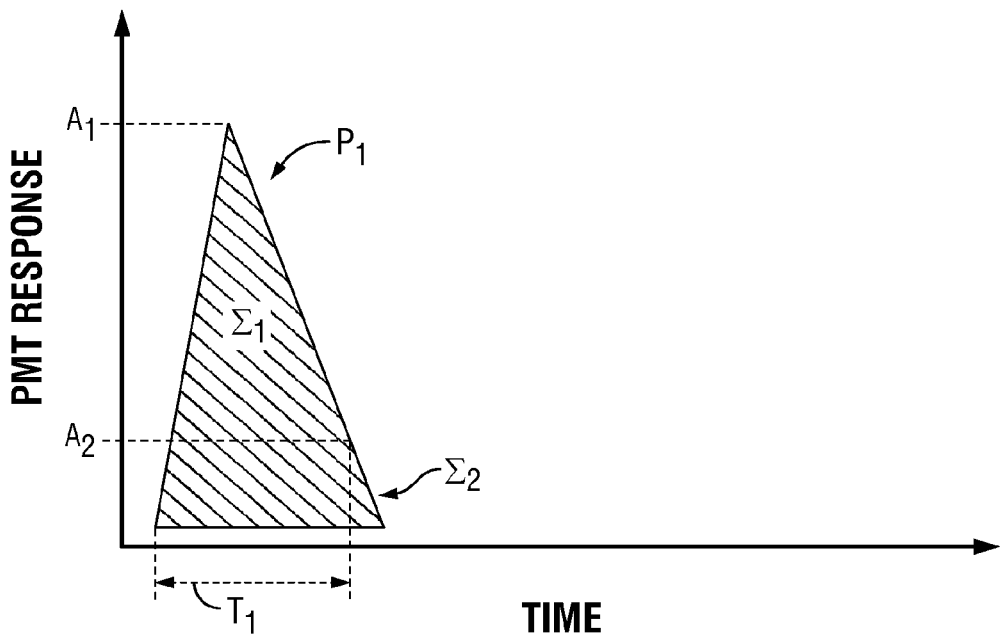
FIG. 9A shows a schematic plot of a detector's time response to gamma ray interactions with a scintillator material.
Figure 9B:
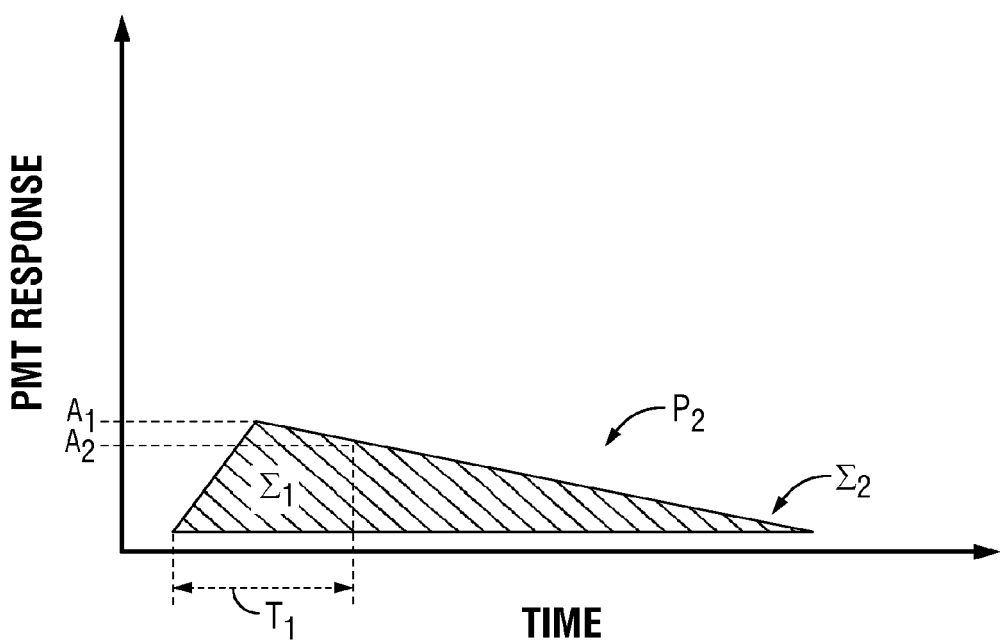
FIG. 9B shows a schematic plot of a detector's time response to neutron interactions with a scintillator material.

In the plots shown in FIGS. 9A and 9B, a neutron interaction and a gamma ray interaction are distinguished using PSD in conjunction with a LiCAF scintillator. FIG. 9A shows a plot of a representative detector's (e.g. LiCAF scintillator)

response to a gamma ray interaction. In the illustrative example, a first pulse shape P1 is obtained as a detector output from the gamma ray interaction. As shown the response is intense, but short lived. FIG. 9B shows a plot of a representative detector's (e.g. LiCAF scintillator) response to a neutron interaction. In the example, a second pulse shape P2 is obtained as detector output from the neutron interaction. By comparison, the neutron response is less intense and exhibits a greater duration. The different "shape" of the responses can be used to discriminate between the two types of interactions.

To this end, the shapes of the responses are measured and characterized numerically. As illustrated in the FIGS. 9A and 9B, the first pulse P1 (e.g., gamma ray response) has a peak response value of A1 and a particular response value of A2 at time T1. Within time T1, the pulse has a first respective area under the plot of $\Sigma 1$ and a total area under the plot of $\Sigma 2$. Similarly, the second pulse P2 (e.g., neutron response) has a peak response value of A1 and a particular response value of A2 at time T1. Within time T1, the pulse has a first respective area under the plot of $\Sigma 1$ and a total area under the plot of $\Sigma 2$. These numerical values can be compared and used to estimate whether a detected interaction corresponds to a gamma ray interaction or a neutron interaction. One such comparison can be a simple ratio of A1/A2—a relatively large ratio indicative of a gamma ray interaction, while a relatively small ratio indicative of a neutron interaction. In another example, the comparison is made using the ratio of $\Sigma 1/\Sigma 2$—a relatively large ratio indicative of a gamma ray interaction, while a relatively small ratio indicative of a neutron interaction. A computer processor or specialized electronics can be programmed to distinguish between neutron interactions and gamma ray interactions based upon the above described pulse shape discrimination. For example, well known signal processing techniques can be applied to detector output signals to otherwise differentiate between multiple different detector responses. The processing may be applied independently of the signal being generated in a single scintillator slab or a combination of two (or more) scintillator slabs on the same photodetector.

PHD and PSD may be combined for additional benefits. For example, if PSD is used based on an amplitude ratio as described above, a PHD may be useful to limit the range of amplitudes under consideration. This eliminates artifacts from ratios between small signals or large signals that could introduce systematic errors. In addition PSD may require more computing power and PHD may therefore be advantageous to reduce the data rate by preselecting data in the right pulse height range.

Figure 10:
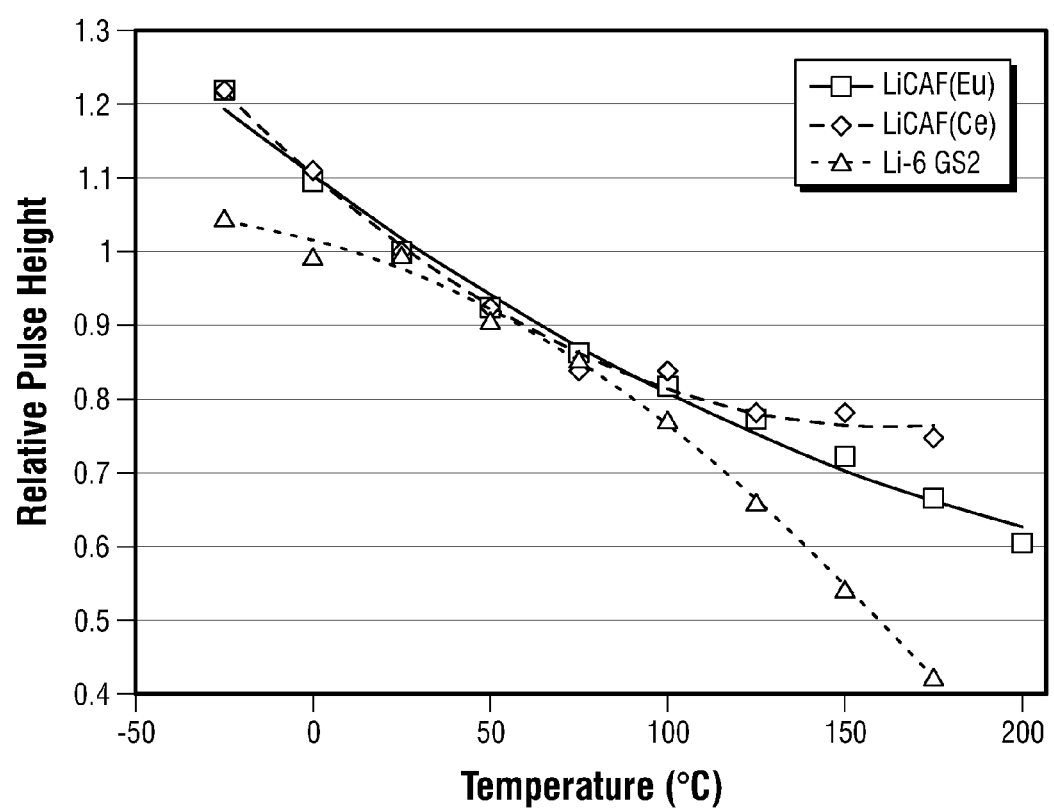
FIG. 10 shows a plot of relative pulse-height versus temperature comparison for examples of different scintillator materials determined for a common PMT configuration in accordance with one embodiment of the present disclosure.

FIG. 10 shows a plot of relative pulse-height versus temperature for different scintillator materials. The pulse heights of the three detectors were normalized at room temperature. The relative light output for europium-doped LiCAF and cerium-doped LiCAF are superior to relative light output for lithium-glass. FIG. 10 shows that the pulse height of LiCAF relative to lithium-glass increases both at low temperatures measured down to −25° C. and at high temperatures measured up to 200° C. These temperatures cover the most common oilfield logging applications.

Figure 11:
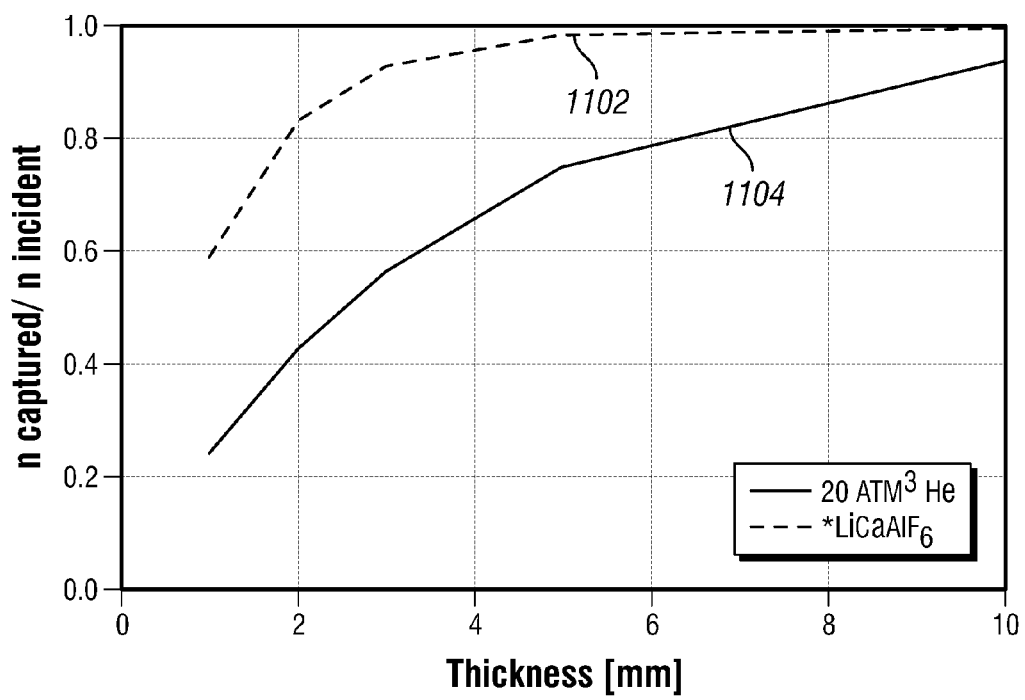
FIG. 11 shows a plot of predicted neutron capture efficiency versus scintillator thickness for different scintillator materials in accordance with some embodiments of the present disclosure.
Figure 12:
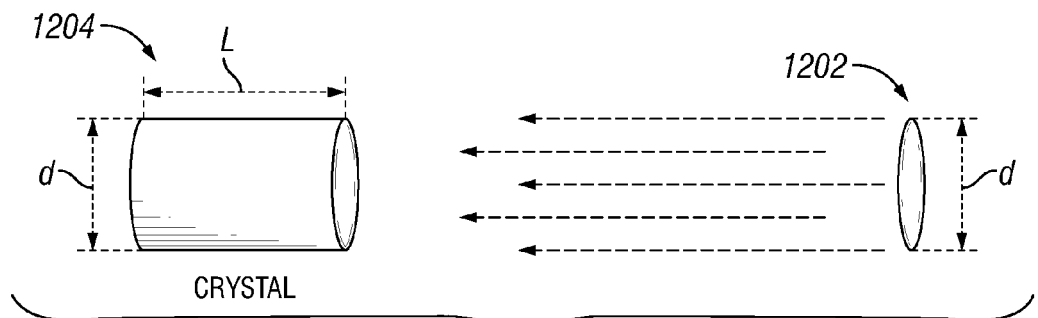
FIG. 12 shows a schematic diagram of a crystalline scintillator used in obtaining the predictions shown in FIG. 11 in accordance with one embodiment of the present disclosure.

FIG. 11 shows a plot of neutron capture versus scintillator thickness for different scintillator materials. The plot was obtained by modeling thermal neutron capture on a 25.4 mm (1 inch) diameter slab of $LiCaAlF_6$ (95% $^6Li$ enriched) for different slab thicknesses (top curve 1102) in comparison to an equivalent volume of $^3He$ gas (bottom curve 1104). The corresponding geometry is shown in FIG. 12 with a source 1202 disposed on the right-hand side and a detector 1204 on the left-hand side. The detector includes a diameter (d) and a thickness (L). A LiCAF slab with a 3 mm thickness is sufficient to stop over 90% of the neutrons.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

We claim:

1. A borehole logging tool comprising:
    a neutron source;
    a scintillator positioned to interact with scattered source neutrons received from a target formation, the scintillator configured to emit luminescence in response to interaction with the scattered neutrons, wherein the scintillator comprises an aluminofluoride host material doped with europium; and
    a luminescence detector configured to provide an output signal indicative of detected luminescence of the scintillator.

2. The borehole logging tool of claim 1, wherein the aluminofluoride host comprises LiCAF.

3. The borehole logging tool of claim 1, wherein the scattered neutrons comprise thermal and epithermal neutrons.

4. The borehole logging tool of claim 1, further comprising:
    a light guide for coupling the scintillator to the luminescence detector.

5. A borehole logging system comprising:
    a neutron source;
    a scintillator positioned to interact with scattered source neutrons received from a target formation, the scintillator configured to emit luminescence in response to interaction with the scattered neutrons, wherein the scintillator comprises an aluminofluoride host material;
    a luminescence detector configured to provide an output signal indicative of detected luminescence of the scintillator; and
    a processor configured to receive the output signal and distinguish the scattered neutrons from gamma rays based upon identifying a peak within the output signal.

6. The borehole logging system of claim 5, wherein the peak within the output signal is identified using pulse shape discrimination.

7. The borehole logging system of claim 5, wherein the peak within the output signal is identified by defining a discriminator region.

8. The borehole logging system of claim 5, wherein the peak within the output signal is identified using pulse height discrimination.

9. The borehole logging system of claim 5, wherein the aluminofluoride host is LiCAF.

10. The borehole logging system of claim 9, wherein the aluminofluoride host is doped with an active dopant.

11. The borehole logging system of claim 10, wherein the aluminofluoride host is doped with a rare earth material.

12. The borehole logging system of claim 5, wherein the aluminofluoride host is doped with europium.

13. The borehole logging system of claim 5, wherein the aluminofluoride host is doped with cerium.

14. The borehole logging system of claim 5, wherein the scattered neutrons are thermal and epithermal neutrons.

15. A system for neutron detection, the device comprising:
    a first scintillator configured to emit luminescence in response to interaction with neutrons and gamma rays;
    a second scintillator configured to emit luminescence in response to interaction with gamma rays, wherein the second scintillator is different from the first scintillator in at least one response parameter;
a luminescence detector configured to provide an output signal indicative of detected luminescence of the first scintillator and the second scintillator; and
a processor configured to (1) receive the output signal and distinguish between luminescence generated by the first scintillator and luminescence generated by the second scintillator using the at least one response parameter and (2) subtract the luminescence generated by the second scintillator from the luminescence generated by the first scintillator to identify a neutron response of the first scintillator.

16. The system of claim 15, wherein the at least one response parameter is at least one of wavelength of the luminescence or a decay time of the luminescence.

17. The system of claim 15, wherein a gamma ray response of the second scintillator is similar to a gamma ray response of the first scintillator such that the gamma subtraction can be effectively performed.

18. The system of claim 15, wherein the second scintillator is unresponsive to neutrons.

19. The system of claim 15, wherein at least one of the first scintillator and the second scintillator comprise an aluminofluoride host material doped with cerium and at least one of the first scintillator and the second scintillator comprise an aluminofluoride host material doped with europium.

20. The system of claim 15, wherein the second scintillator is shielded from neutron interactions by the first scintillator.

* * * * *